March 24, 1959
C. O. FINN
2,878,617
HYDRAULIC APPARATUS FOR SEEDING, FERTILIZING, OR
SEEDING AND FERTILIZING SOIL
Filed Oct. 11, 1956
3 Sheets-Sheet 1
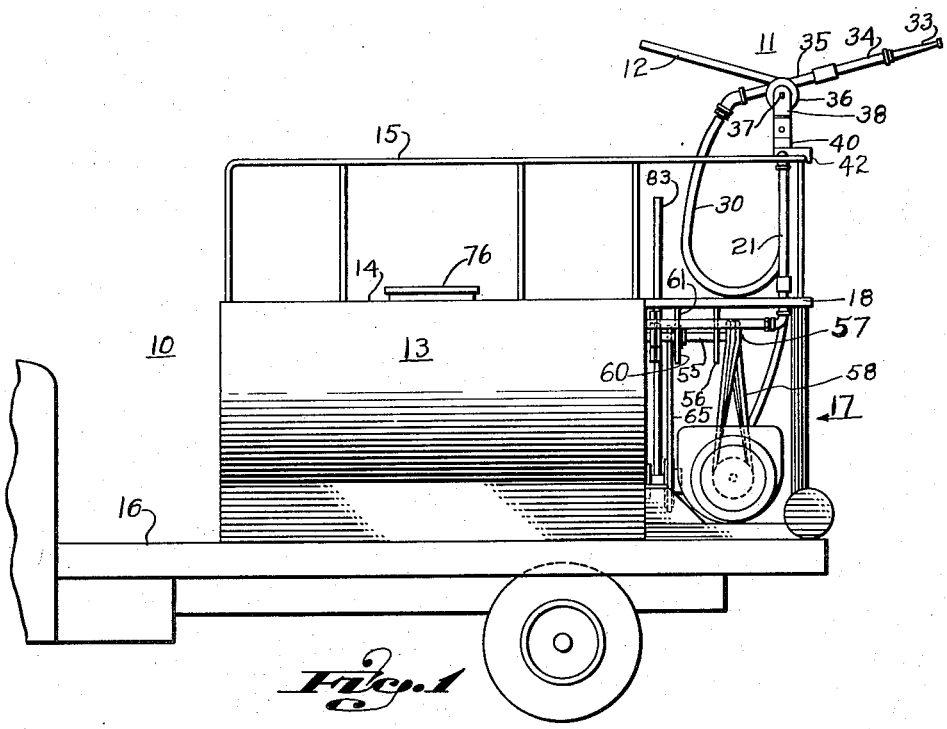
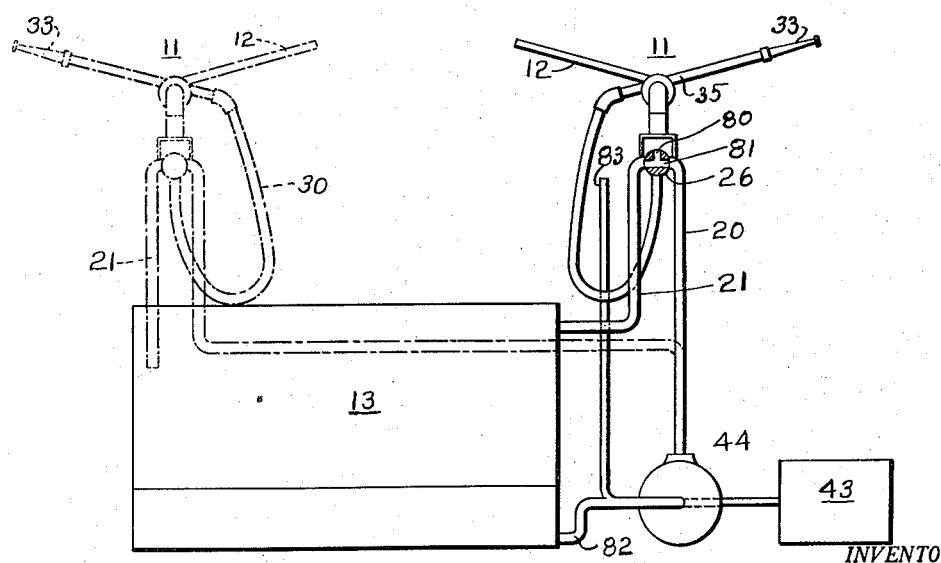
INVENTOR.
Charles O. Finn
BY Gerald B. Tjoflat
His Attorney March 24, 1959 C. O. FINN 2,878,617
HYDRAULIC APPARATUS FOR SEEDING, FERTILIZING, OR
SEEDING AND FERTILIZING SOIL
Filed Oct. 11, 1956 3 Sheets-Sheet 2

INVENTOR.
Charles O. Finn
BY Gerald B. Tjoflat
His Attorney

INVENTOR.
Charles O. Finn
BY Gerald B. Tjoflat
His Attorney

United States Patent Office 2,878,617
Patented Mar. 24, 1959

2,878,617

HYDRAULIC APPARATUS FOR SEEDING, FERTILIZING, OR SEEDING AND FERTILIZING SOIL

Charles O. Finn, Cincinnati, Ohio, assignor to The Finn Equipment Company, Cincinnati, Ohio, a corporation of Ohio Application October 11, 1956, Serial No. 615,386

3 Claims. (Cl. 47—1)

This invention relates to apparatus for seeding, fertilizing, or seeding and fertilizing soil hydraulically.

More particularly, the invention relates to apparatus for pumping to a spray unit, aqueous dispersions of seed, seed and fertilizer, or seed, fertilizer, lime and other solids, such as peat moss for example, whereby soil areas may be covered with said aqueous dispersion.

When aqueous dispersions of the type above mentioned are delivered from a tank by a pump to a spray nozzle, various problems arise. Because of the high solids content of the dispersion, plugging of the nozzle is likely ot occur frequently unless the dispersion can be kept in circulation through the pump when the flow to the nozzle is shut off. Furthermore, in cases where the intake of the pump is above the connection thereof to the contents of the tank, the pump may lose its prime, particularly if stopped when the liquid level in the tank is below the level of the pump intake. Therefore, it is important to maintain continuous circulation through the pump at all times to prevent plugging of the inlet to the nozzle when it is shut off and to prevent the loss of the prime on the pump when the level in the tank is below that of the intake to the pump.

The pump and the spray nozzle units and the connections thereto may be carried by the tank unit or on a separate unit, such as the tractor for the tank unit. In any case, the tank will be carried by a mobile unit, such as a truck arranged to be hauled by a tractor or truck. The pumping unit may be mounted on either the tank unit or the tractor unit.

The hydraulic seeding and fertilizing of soil areas is a rapidly moving development occasioned to a large extent by the turnpike and toll road movements. The steep, barren and rocky slopes of cuts through which modern roads pass are difficult to seed and fertilize. The hydraulic development makes it possible to seed steep, rocky and barren slopes that cannot be seeded otherwise than by hand, the cost of which is prohibitive and the results unsatisfactory.

There is also a trend to not only seed barren roadside slopes, but also to beautify them with shrubs and flowers. Here again the cost has been prohibitive because such work has heretofore been done chiefly by manual labor. As will be shown infra, the apparatus of the invention makes it possible to not only seed and fertilize these roadside slopes, but also to plant flower seeds in desired patterns simultaneously with the hydraulic seeding and fertilizing operation.

An object of this invention therefore, is to provide a pumping and spraying unit for hydraulically seeding or seeding and fertilizing barren slopes which are difficult to reach, and which are almost impossible to fertilize and seed other than by manual labor.

A further object of the invention is to provide a pumping and spraying equipment which is so constructed that the circulation through the pump is maintained at all times whether or not the aqueous dispersion is being delivered to the spray nozzle or not.

A still further object of the invention is to provide a pumping and spraying unit which is so constructed that the pump will not lose its prime even when the level of the aqueous dispersion in the tank is below the intake of the pump.

A still further object is to provide a circulating system for an aqueous seeding unit which is so arranged as to prevent the loss of the prime of the pump, even though the pump is a centrifugal pump.

A still further object of the invention is to provide a pumping unit and hydraulic space system for seeding and fertilizing soil areas provided with means whereby flower and other seeds as distinguished from grass seeds may be planted in patterns according to a predetermined design.

And a still further object of the invention is to provide a system as stated in the preceding object with means whereby flower seeds may be planted in slugs on concentrated areas on the soil slope while other seed and fertilizer is being applied to the soil slope hydraulically.

The foregoing and other objects of the invention will be apparent to those of ordinary skill in the art to which it pertains from the following description taken in conjunction with the accompanying drawings.

In the drawings:

Figure 1 is a more or less fragmentary view of a truck or trailer on which a tank and a pumping and spray unit arranged in accordance with the invention, are mounted;

Figure 6:
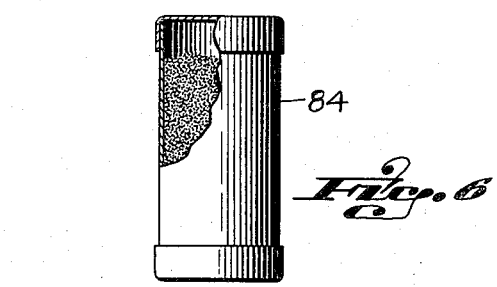

Fig. 6 is a view partially in section of a shatterable cartridge containing special seeds, such as flower seeds and fertilizer, whereby such seeds may be planted in patterns while other seeds are being hydraulically seeded by means of the apparatus shown in Figs. 1, 3, 4, 5 and 7; and Fig. 7 is a more or less diagrammatic view showing the flow cycle of the aqueous dispersion of seed, fertilizer, etc., through the pump and to the spray nozzle and the return to the tank.

Figure 2:
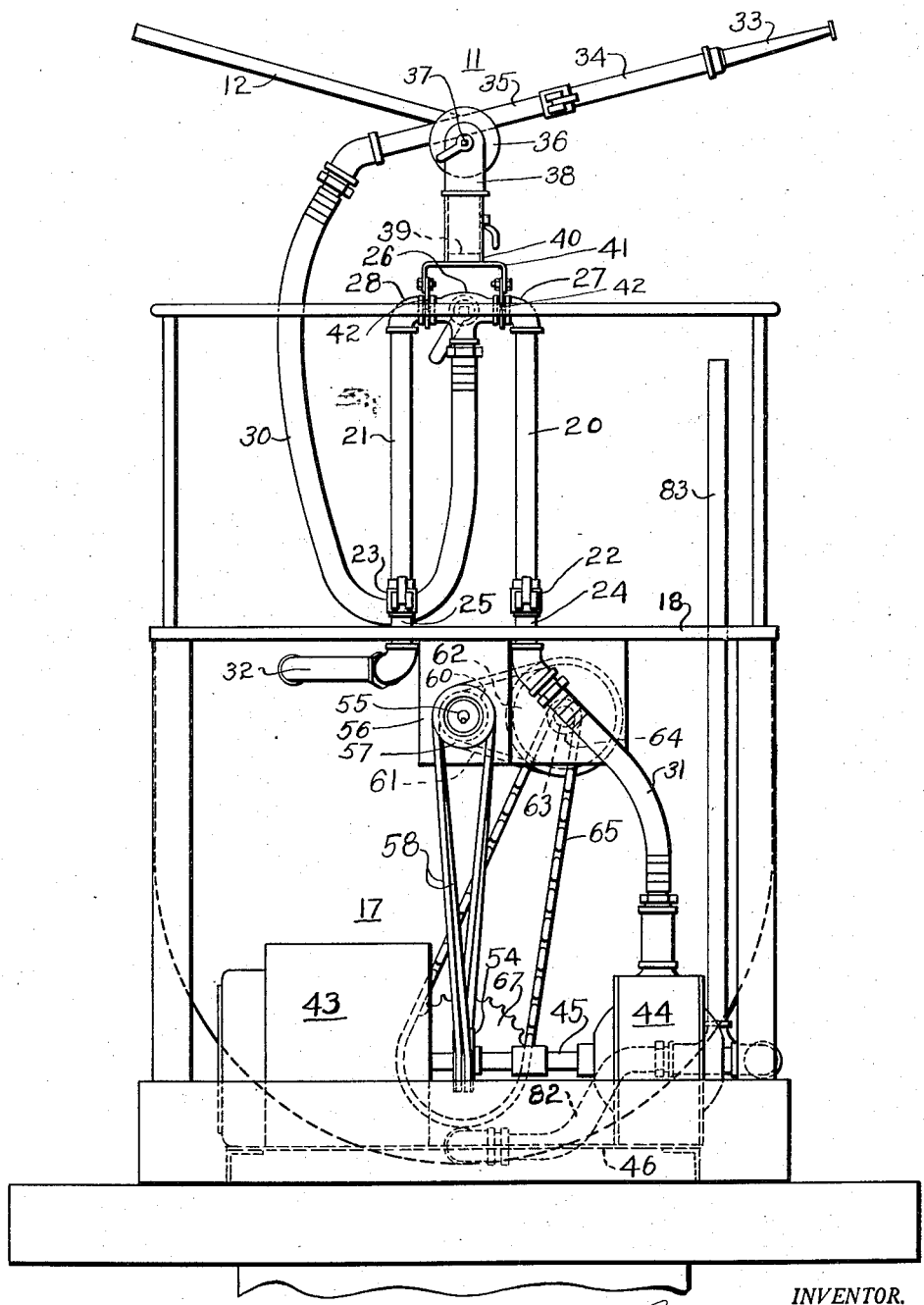
Fig. 2 is a view in end elevation of the pumping unit end of the tank shown in Fig. 1.

In the drawings, particularly Figures 1, 2 and 7 thereof, a mobile apparatus 10 is shown whereby soil areas may be seeded, fertilized or seeded and fertilized and otherwise conditioned by spraying on those areas aqueous suspensions of the desired composition. The suspension may consist of seed in the quantity required to provide the necessary seed coverage per acre, lime, fertilizer and if desired other solids such as peat moss. The solids concentration other than seed content per 1000 gallons of water may be as follows:

Lime—500 pounds,
Fertilizer—300 to 500 pounds,
Peat moss—two bales (about 200 to 300 pounds total more or less).

The apparatus 10 is provided with means described infra whereby the dispersion is continuously agitated to maintain the solids in a uniform consistency in the water as a vehicle.

The suspension is sprayed over the soil areas while the apparatus is in motion through a spray nozzle unit 11, the elevation and horizontal sweep of which may be controlled by a handle 12 which is manipulated by an operator riding on the apparatus.

Apparatus 10 comprises a tank 13 having a flat platform top or cover 14 provided with a guard rail 15 at the marginal perimeter thereof. The tank may be mounted on a motor truck 16 or on a trailer and hauled by a truck or tractor not shown. The apparatus also includes a motor driven pumping unit 17. The spray nozzle unit 11 and the pumping unit 17 may be mounted with the tank or it may be mounted on the truck or tractor which hauls the tank.

Where large scale operations are involved it may be more economical to mount the spray nozzle unit and the pumping unit on the hauling tractor or truck than on the tank containing the suspension because a relatively large number of tanks may be required in order to keep the spraying unit continuously supplied with batches of the aqueous suspension. As shown in the drawings hereof, the pump and spray units are mounted on the vehicle which carries the tank 13.

The spray nozzle unit 11 is mounted on an extension 18 of the tank platform or top 14 that projects rearwardly of the tank, while the pumping unit 17 is mounted on the vehicle below the extension.

The spray unit comprises a riser pipe 20 and a return pipe 21 which are detachably secured by connectors 22 and 23 to pipe couplings 24 and 25, respectively, extending and secured to the extension 18. The riser and return pipes 20 and 21, respectively, are interconnected by a three-way valve 26 and elbows 27 and 28. The spray nozzle assembly is connected by a flexible hose 30 to the outlet port of the valve 26.

The lower end of the riser pipe 20 is supplied by the pump of the pumping unit through a flexible hose 31 while the lower end of the return pipe 21 is connected by a pipe 32 to the interior of tank 13.

The spray nozzle assembly comprises a nozzle 33 mounted on the outlet end of a pipe 34. The pipe 34 is coupled to a swiveled pipe section 35 which is mounted between and secured to disks 36. The disks 36 are rotatably mounted on a pivot 37 secured in a clevis 38. The clevis includes a tubular base 39 which is received within a tubular support 40 carried by a U-shaped bracket 41 clamped to the valve 26. The legs of the bracket 41 are provided with rearwardly extending members 42 that rest on the guard rail 15 as shown in Figs. 1 and 2. By means of the handle 12 which is secured to the pipe section 35, the nozzle 33 may be swung in an horizontal arc about the vertical pivot formed by members 38, 39 or in a vertical arc about the horizontal pivot 37, by an operator standing on the platform 18.

The pumping unit 17 comprises a motor 43, preferably an internal combustion engine, and a pump 44, preferably a centrifugal pump. The motor drives the pump directly through a shaft 45. The pump and motor are mounted on a platform 46 directly below the extension 18.

Figure 3:
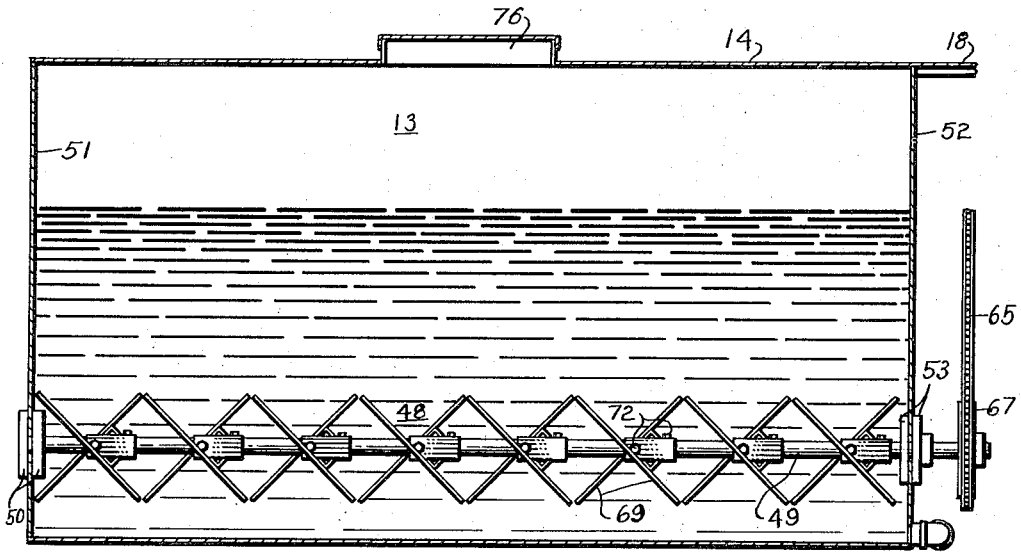
Fig. 3 is a view in longitudinal section of the tank unit showing the construction of an agitator therefor.

Since it is important that the solids in the suspension in tank 13 be maintained in a thoroughly dispersed condition, a mixer or agitator 48 is provided for that purpose. The mixer or agitator comprises a shaft 49 located within the tank and extending lengthwise thereof but near the bottom. As shown in Fig. 3, one end of the shaft 49 is mounted in a bearing 50 carried by end wall 51 of the tank 13, while the opposite end extends through the end wall 52 and is journaled in a bearing 53 carried by that wall.

The shaft 49 is driven by the motor pump shaft 45. The drive comprises a sheave 54 on shaft 45, a jack shaft 55 secured in a mount 56 carried by the end wall 52 and the extension 18. Jack shaft 55 is provided with pulleys or sheaves 57. Belts 58 run on the motor shaft sheave 54 and the jack shaft sheaves 57. The jack shaft 55 also carries a sheave or pulley 60 on which a belt 61 runs. Belt 61 drives a sheave 62 mounted on a jack shaft 63 secured as shown, on which a sprocket pinion 64 is mounted. A chain 65 driven by the sprocket pinion 64 drives a sprocket wheel 67 on the agitator shaft 49.

Figures 4, 5:
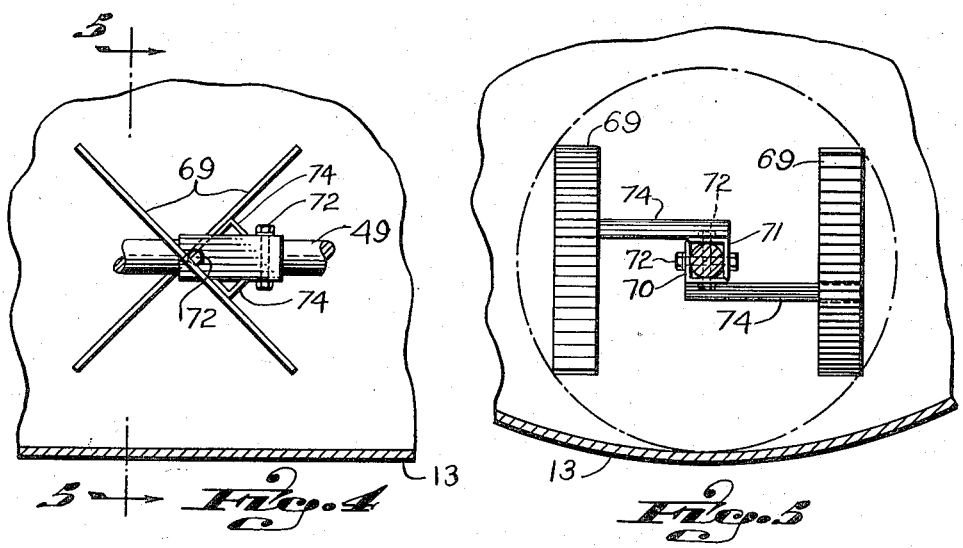
Fig. 4 is an enlarged fragmentary view of a portion of the agitator of Fig. 3.
Fig. 5 is a view in section taken on line 5—5 of Fig. 4.

The agitator is provided with a plurality of spaced groups of agitator blades or paddles 69, that are secured as shown in Figs. 4 and 5 to relatively short angle members 70 and 71 so arranged as to box-in a corresponding length of the shaft 49. These angle members 70 and 71 may be secured by bolts 72 that extend through the shaft 49.

The blades or paddles 69 are secured to angle members 74 attached to the angle members 70 and 71, respectively. As shown, the inner ends of members 74 are attached as by welding to a flange of the angle members 71 and 72 and project in opposite directions therefrom. The paddles 69 are mounted crosswise of and are secured to the outer ends of the members 74.

The paddles 69 are so positioned that the ends thereof are equidistant from the longitudinal axis of the shaft 49. As Figures 3 and 4 show, the edges of the paddle members 69 cut through the suspension as the shaft rotates. Furthermore, because of the angular positions of the paddles, the edges thereof cut through a substantial volume of the suspension at all times.

The suspension is formed by charging the tank 13 with a quantity of water, preferably less than its capacity. The seed, fertilizer, lime, peat moss or whatever materials are required, are charged through a door 76 in the cover 14. When peat moss is used in the suspension, a bale or two thereof is dropped through the door. As the agitator revolves, those bales are thoroughly broken up. When the total solids and semi solids have been added to the water in the tank, additional water is added to capacity level of the tank.

The pump unit and agitator are kept running all the while the tank is transported to the place where the suspension is to be used. During this time, the valve 26 is circulate the suspension through the riser 20, the valve and in the position shown in Fig. 7 so that the pump will the return pipe 21 to the tank. When the suspension is to be sprayed over soil areas, the valve 26 is turned 90 degrees from the position shown in Fig. 7 in which position ways 80 and 81 connect the riser leg 20 with the spray unit hose 30.

To shut off flow to the spray nozzle, valve 26 is returned to the position shown in Fig. 7 in which position the suspension is returned through the tank. Thus circulation and agitation of the suspension is maintained at all times which prevents plugging of the spray unit. It also prevents loss of prime of the pump when the level in the tank gets low, particularly below the intake level of the pump.

Figure 7 illustrates schematically the flow diagram of the suspension. In that view, the motor and pump, the valve and the riser and return legs are indicated by the same reference characters that have been applied to Figures 1 and 2. The flow circuit begins with the tank at a location near the bottom thereof and proceeds through an intake pipe 82 connected to the intake of the pump 44. The pump discharges through the riser 20, the valve 26 and the return pipe 21 into the top of the tank 13. When the suspension is to be delivered to the nozzle 33, the valve 26 is turned 90 degrees so that the flow circuit is from the tank through the pump, the riser 20, the ways 80 and 81 of the valve to the nozzle.

Figure 3 also indicates that the spray unit may be mounted at either end of the tank 13. The dotted line position of the spray unit indicates that it may be at either end.

As stated supra, the use of hydraulic seeding is becoming more and more popular. There is also a growing demand that the roadsides not only be covered with grass, but that they should also be beautified with flowers and shrubs. In order to provide for the seeding of flowers along a roadside while the same is being seeded with grass seed and fertilized, means are provided whereby a concentrated charge of flower seeds with fertilizer suited to them, may be delivered to the pump while in operation and discharged upon the areas being seeded. The means is so arranged that if the charging of the pump with these seeds is properly timed with the speed of motion of the hydraulic seeder, flowers may be planted in patterns. The pattern can be controlled by the sweep of the nozzle and by the frequency at which these flower seeds are charged into the pump.

In order to provide for the slug seeding of flower seeds, the pump unit is provided with a stand pipe 83. That pipe may extend downwardly into the tank and be connected to the pipe extending into the same or it may be connected to the intake pipe 82 leading to the pump suction as shown more particularly in Fig. 7. Since the stand pipe 83 is connected at its bottom to the suction of the pump, and rises to a higher level, higher than that of the liquid in the tank 13, it follows that any cartridge containing seeds which is dropped into that pipe, will be taken into the pump 44. The nature of the cartridge is such that the pump will shatter it and then discharge the seeds and the flower fertilizer with the suspension being delivered to the hose 33.

In Figure 6 a cartridge is shown containing a mixture of flower or other decorative seeds with a fertilizer suitable to the particular seed involved. The cartridge may be approximately two inches long, by approximately one inch in diameter. The cartridge shell may comprise a paper cylinder with caps at each end. The cartridge shatters thoroughly as it passes through the pump.

Experience with the slug feeding of seeds into the intake of the pump shows that the cartridge is effectively disintegrated and that it does not plug up the nozzle through which the dispersion or suspension discharges upon the soil areas. Flower seeds and the like which are fed in batches into the intake of the pump will land on the soil areas in a relatively concentrated condition so that when they germinate and grow, the landscape will be covered with patches of flowers. By the skillful manipulation of the nozzle or spray unit and coordinating the timing of the feeding of cartridges to the intake of the pump with the speed of travel of the tank and spray unit, flowers may be seeded in patterns on areas along roadsides and other places. It is also possible to slug-feed flower seeds which are native to the areas through which highways run thereby giving variety and beauty to the highways and at the same time making certain that flower seeds that are most likely to grow are planted. The flower seeds may be of the cultivated or wild varieties.

Having thus described the invention, it will be apparent to those of ordinary skill in the art to which the invention pertains, that various modifications and changes may be made in the illustrated embodiments without departing from either the spirit or the scope thereof.

Therefore, what is claimed as new and desired to be secured by Letters Patent is:

1. In a mobile apparatus for spraying high solids content aqueous suspensions of agricultural materials such as grass seed, fertilizer, lime and other soil conditioning materials and mixtures thereof, the combination of a truck, a tank mounted on the truck, a shaft rotatably mounted in and extending lengthwise of the tank adjacent the bottom thereof, said shaft having contiguous opposed pairs of agitators and comminuting members along the length thereof comprising arms extending in opposite directions from the shaft for each pair of agitators and comminuting members, each arm having at its outer end a blade, said blade members at the ends of each pair of arms being disposed in planes that intersect at substantially 90° to each other, and drive means mounted on the vehicle for rotating the shaft, of a motor drivable pump and a spray apparatus having a spray nozzle, a conduit connecting the pump intake to the suspension in the tank at a location below the shaft, a riser pipe connected to the outlet of the pump, a return pipe leading to the tank, a three-way valve connecting said riser and return pipes, and a conduit connecting the valve to the spray apparatus, said valve when in one position connecting the riser pipe to the spray apparatus and in another position connecting the riser pipe to the return pipe and shutting off flow to the spray apparatus, whereby flow to the pump and riser pipe is maintained whether the nozzle unit is supplied or not to prevent plugging of the flow circuit.

2. Apparatus as in claim 1 in which means are provided for direct admission to the intake of the pump of a shatterable cartridge containing seeds other than grass seed, whereby when the cartridge enters the pump it is shattered and the seeds therein are discharged through the spray unit as a concentrated charge.

3. Apparatus for seeding and fertilizing soil areas hydraulically and also supplying to such areas flower seeds and the like in concentrated form to provide a decorative effect, comprising a motor driven pumping unit and a spray unit, a mobile tank containing an aqueous suspension of grass seed, fertilizer and such other conditioning agent as the soil requires, a conduit connecting the tank to the intake of the pump, a three-way valve connected to the spray unit, a conduit connecting the discharge of the pump to the valve, a return conduit connected to the valve and to the tank, and a riser pipe connected at its lower end to the intake conduit and extending upwardly to a level above the level of suspension in the tank, said riser pipe being adapted to receive shatterable cartridges containing flower seeds which fall by gravity into the suspension flowing to the pump in which they are shattered and the seeds delivered in concentrated form to the spray nozzle unit.

References Cited in the file of this patent

UNITED STATES PATENTS 2,193,338 Magnuson ------------ Mar. 12, 1940

FOREIGN PATENTS 615,764 France ---------------- Oct. 18, 1926

OTHER REFERENCES

New Horticulture Methods Needed to Mechanize Landscaping and Roadside Work, Roads and Streets, October 1947, pages 89 and 90.